(12) United States Patent
Nakamura et al.

(10) Patent No.: US 7,641,031 B2
(45) Date of Patent: Jan. 5, 2010

(54) CONTROL APPARATUS FOR VEHICLE

(75) Inventors: Kazuaki Nakamura, Toyota (JP);
Hiromichi Kimura, Okazaki (JP);
Kazuyuki Watanabe, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 414 days.

(21) Appl. No.: 11/442,337

(22) Filed: May 30, 2006

(65) Prior Publication Data

US 2006/0272914 A1 Dec. 7, 2006

(30) Foreign Application Priority Data

Jun. 1, 2005 (JP) .............................. 2005-161635

(51) Int. Cl.
*F16H 61/14* (2006.01)
(52) U.S. Cl. ...................... 192/3.31; 477/169; 477/176; 701/68
(58) Field of Classification Search ........................ None
See application file for complete search history.

(56) References Cited

U.S. PATENT DOCUMENTS 5,588,937 A * 12/1996 Kono et al. .................. 477/169
5,722,912 A * 3/1998 Narita .......................... 477/64
6,049,752 A    4/2000 Katakura et al.
6,290,626 B1   9/2001 Noda et al.
6,482,126 B2 * 11/2002 Kawaguchi .................. 477/180
6,637,566 B2 * 10/2003 Takatori et al. .............. 192/3.3

FOREIGN PATENT DOCUMENTS

| DE | 197 18 466 C 2 | 11/1997 |
| DE | 199 55 799 A 1 | 5/2000 |
| JP | 62-297567 | 12/1987 |
| JP | 2-80857 | 3/1990 |
| JP | 7-35232 | 2/1995 |
| JP | 2003-065432 | 3/2003 |
| JP | 2003-65433 | 3/2003 |
| KR | 10-0413663 | 12/2003 |
| KR | 10-0450697 | 10/2004 |

* cited by examiner

*Primary Examiner*—Richard M. Lorence
(74) *Attorney, Agent, or Firm*—Oblon, Spivak, McClelland, Maier & Neustadt, L.L.P.

(57) ABSTRACT

When a traveling state is in an engagement range of a lock-up clutch, an ECU executes a program including a step of executing slip control if preconditions are satisfied and learning start conditions are satisfied, a step of updating a learning value if an output value is not greater than an FF control value+α or not smaller than the FF control value+β, and a step of engaging the lock-up clutch.

15 Claims, 10 Drawing Sheets

F I G. 2
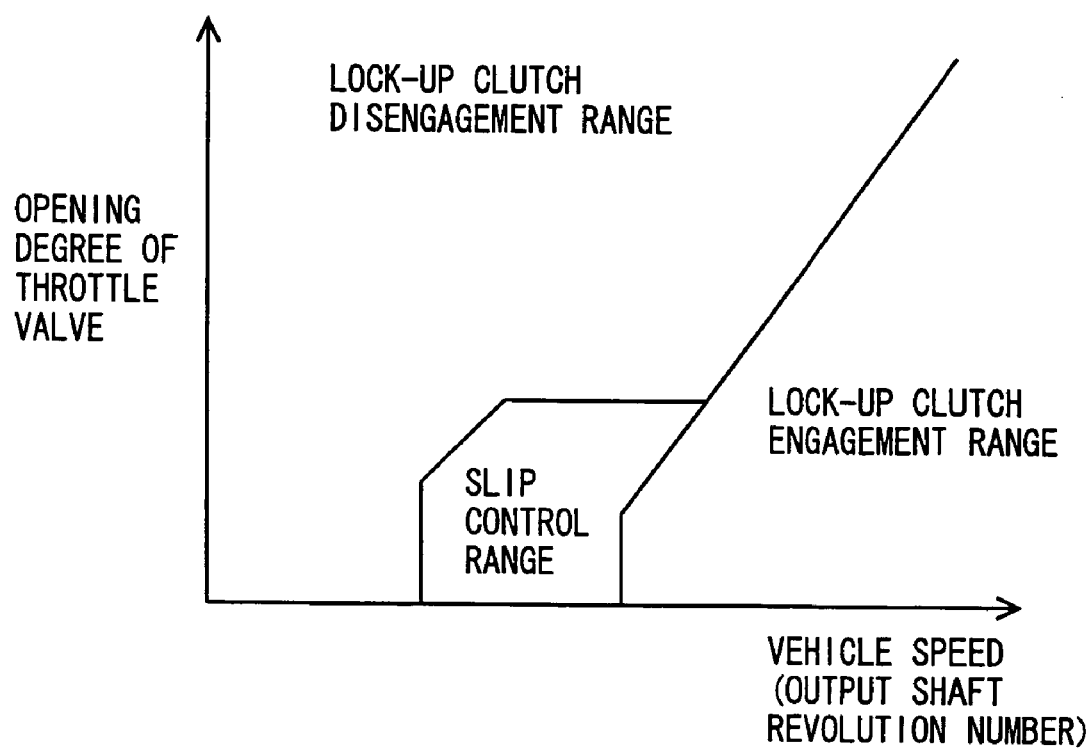

F I G. 4
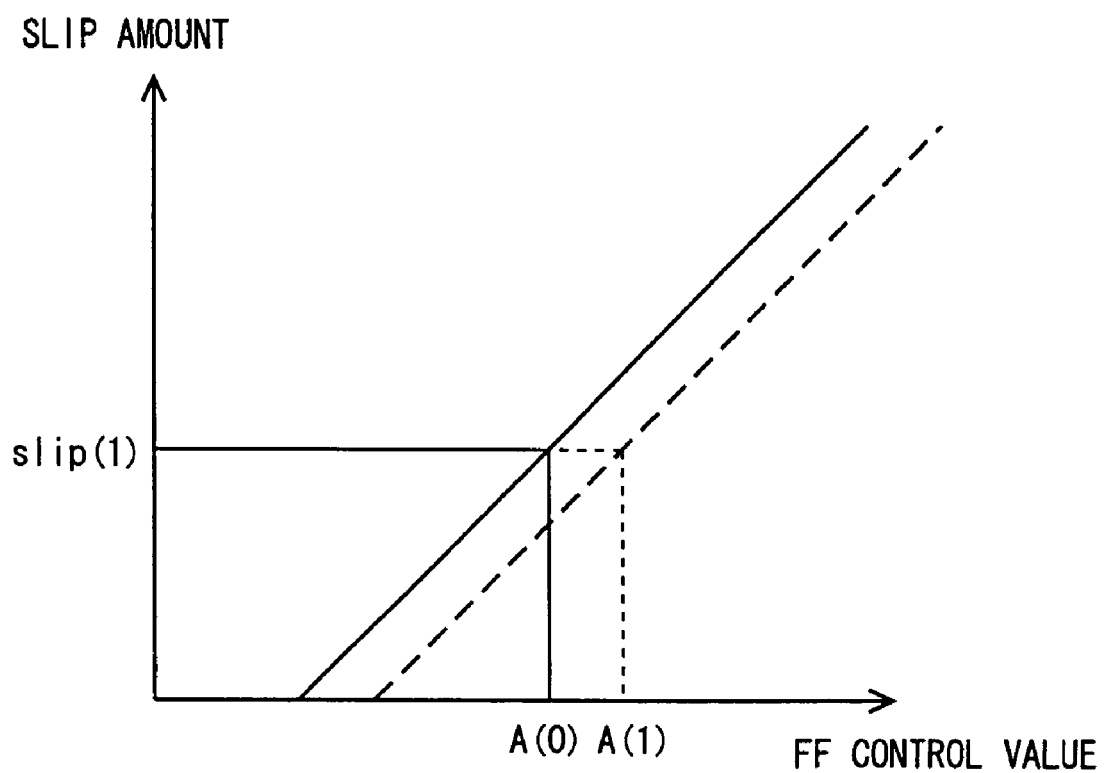

CONTROL APPARATUS FOR VEHICLE

This nonprovisional application is based on Japanese Patent Application No. 2005-161635 filed with the Japan Patent Office on Jun. 1, 2005, the entire contents of which are hereby incorporated by reference.

BACKGROUND OF THE INVENTION

1. Field of the Invention

The present invention relates to a control apparatus for a vehicle incorporating an automatic transmission including a hydraulic coupling with a lock-up clutch, and particularly to a technique of learning, in controlling engagement force of the lock-up clutch so that a slip amount thereof meets a predetermined slip amount, a control value for obtaining the predetermined slip amount.

2. Description of the Background Art

An automatic transmission for a vehicle is constituted of a hydraulic coupling connected to an output shaft of an engine and a transmission mechanism of gear type or a continuously variable transmission mechanism of belt type or traction type connected to the output shaft of the hydraulic coupling. An example of the hydraulic coupling is a torque converter, which often has a lock-up clutch that enables direct coupling of the input side and the output side of the torque converter. Engagement of the lock-up clutch provides control of directly coupling the input side and the output side of the torque converter, and provides feedback control (slip control) for attaining a prescribed state of the engagement pressure of the lock-up clutch in accordance with the difference between the number of revolutions of the pump on the input side (corresponding to the number of revolutions of the engine) and the number of revolutions of the turbine on the output side to thereby provide control of the slip state of the torque converter.

As such slip control, for example Japanese Patent Laying-Open No. 07-035232 discloses a slip control apparatus for a lock-up clutch for a vehicle, wherein appropriate slip control is provided even when an engine output fluctuates due to a change in the outside air pressure or the like. The slip control apparatus includes slip controlling means for determining a control input for the slip control in accordance with values of control parameters from a data map that is preset so that a target slip amount is obtained based on control parameters prescribed with reference to a predetermined standard engine output state, and for controlling the engagement force of the lock-up clutch in accordance with the control input: The slip control apparatus includes learning means for updating the control input of the data map in accordance with the control parameters so that the slip amount of the lock-up clutch meets the target slip amount, output fluctuation detecting means for detecting whether or not an engine output state fluctuates from the standard engine output state, and learning limiting means for prohibiting update of the data map by the learning means when the fluctuation of the engine output state is detected by the output fluctuation detecting means.

According to the slip control apparatus, the control input of the data map is learned corresponding to the control parameters so that the slip amount of the lock-up clutch meets the target slip amount, and the engagement force of the lock-up clutch is controlled in accordance with the learned control input. Accordingly, appropriate slip control can always be provided irrespective of individual differences among engines or changes in the engine output over time. Additionally, since the learning of the control input is prohibited upon detection of the fluctuation in the engine output state from the standard engine output state, erroneous slip control will not be provided when the engine output state returns to the standard engine output state.

However, when an engagement range of the lock-up clutch is increased in order to improve the fuel efficiency, a slip control range is set smaller and the frequency of slip control may be reduced. Hence, there is a problem that the frequency of learning the control value of the engagement force of the lock-up clutch during the slip control is reduced. When the frequency of learning is reduced, the accuracy of the slip control is deteriorated. Thus, hunting where the lock-up clutch repeats engagement and disengagement in the slip control range may occur. Further, the vehicle may be shocked by the hunting.

SUMMARY OF THE INVENTION

An object of the present invention is to provide a control apparatus for a vehicle that improves the accuracy of slip control by increasing learning frequency.

A control apparatus for a vehicle according to one aspect of the present invention implements a control apparatus for a vehicle incorporating an automatic transmission including a hydraulic coupling with a lock-up clutch. The control apparatus for a vehicle includes: a controlling portion controlling engagement force of the lock-up clutch in accordance with a traveling state of the vehicle, so that the lock-up clutch engages when the traveling state is in an engagement range engaging the lock-up clutch, so that the lock-up clutch disengages when the traveling state is in a disengagement range disengaging the lock-up clutch, and so that a slip amount of the lock-up clutch meets a predetermined slip amount when the traveling state is in a slip control range slip-controlling the lock-up clutch; and a learning portion controlling, when the traveling state is in the engagement range, the engagement force of the lock-up clutch so that the slip amount of the lock-up clutch meets a target slip amount, and updating a learning value modifying a control value for obtaining the predetermined slip amount based on a control value of the engagement force corresponding to the target slip amount.

According to the present invention, when the vehicle traveling state is in the engagement range, the engagement force of the lock-up clutch is controlled so that the slip amount of the lock-up clutch meets a target slip amount. Based on a control value of the engagement force corresponding to the target slip amount, a learning value modifying a control value for obtaining a predetermined slip amount is updated. Thus, learning of the control value that has conventionally been performed in the slip control range can also be performed in the engagement range, and therefore the frequency of learning is increased. As a result, the accuracy of the slip control can be improved. Accordingly, the control apparatus for a vehicle that improves the accuracy of slip control by increasing learning frequency can be provided.

Preferably, the target slip amount is a first target slip amount, and the learning portion controls the engagement force of the lock-up clutch so that the slip amount of the lock-up clutch meets a second target slip amount that is different from the first target slip amount, and updates the learning value based on a control value of the engagement force corresponding to the second target slip amount and a control value of the engagement force corresponding to the first target slip amount.

According to the present invention, by updating a learning value based on control values of the engagement force corresponding to a plurality of different target slip amounts, the learning value can be updated with higher accuracy.

A control apparatus for a vehicle according to another aspect of the present invention implements a control apparatus for a vehicle incorporating an automatic transmission including a hydraulic coupling with a lock-up clutch. The control apparatus for a vehicle includes: a controlling portion controlling engagement force of the lock-up clutch in accordance with a traveling state of the vehicle, so that the lock-up clutch engages when the traveling state is in an engagement range engaging the lock-up clutch, so that the lock-up clutch disengages when the traveling state is in a disengagement range disengaging the lock-up clutch, and so that a slip amount of the lock-up clutch meets a predetermined slip amount when the traveling state is in a slip control range slip-controlling the lock-up clutch; and a learning portion controlling, when the traveling state has shifted from the disengagement range to the engagement range, the engagement force of the lock-up clutch so that the slip amount of the lock-up clutch meets a target slip amount, and updating a learning value modifying a control value for obtaining the predetermined slip amount based on a control value of the engagement force corresponding to the target slip amount.

According to the present invention, when the traveling state of the vehicle shifts from the disengagement range to the engagement range, the engagement force of the lock-up clutch is controlled so that the slip amount of the lock-up clutch meets the target slip amount. Based on a control value of the engagement force corresponding to the target slip amount, a learning value modifying a control value for obtaining a predetermined slip amount is updated. Thus, learning of the control value that has conventionally been performed in the slip control range can also be performed when the state shifts from the disengagement range to the engagement range, and therefore the frequency of learning is increased. As a result, the accuracy of the slip control can be improved. Accordingly, the control apparatus for a vehicle that improves the accuracy of slip control by increasing learning frequency can be provided.

Preferably, the target slip amount is a first target slip amount, and the learning portion controls the engagement force of the lock-up clutch so that the slip amount of the lock-up clutch meets a second target slip amount that is different from the first target slip amount, and updates the learning value based on a control value of the engagement force corresponding to the second target slip amount and a control value of the engagement force corresponding to the first target slip amount.

According to the present invention, by updating a learning value based on control values of the engagement force corresponding to a plurality of different target slip amounts, the learning value can be updated with higher accuracy.

Further preferably, the first and second target slip amounts are each at most the predetermined slip amount.

According to the present invention, since the first and second target slip amounts are each at most the predetermined slip amount that is a target value of control when the traveling state of the vehicle is in the slip control range, discomfort of the driver and deterioration in the fuel efficiency can be prevented even when learning is performed when the state is in the engagement range or when the state shifts from the disengagement range to the engagement range.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows control ranges of a lock-up clutch that are set in accordance with throttle opening position and vehicle speed.

FIG. 4 shows the relationship between slip amount and FF control value in the first embodiment.

DESCRIPTION OF THE PREFERRED EMBODIMENTS

Figure 1:
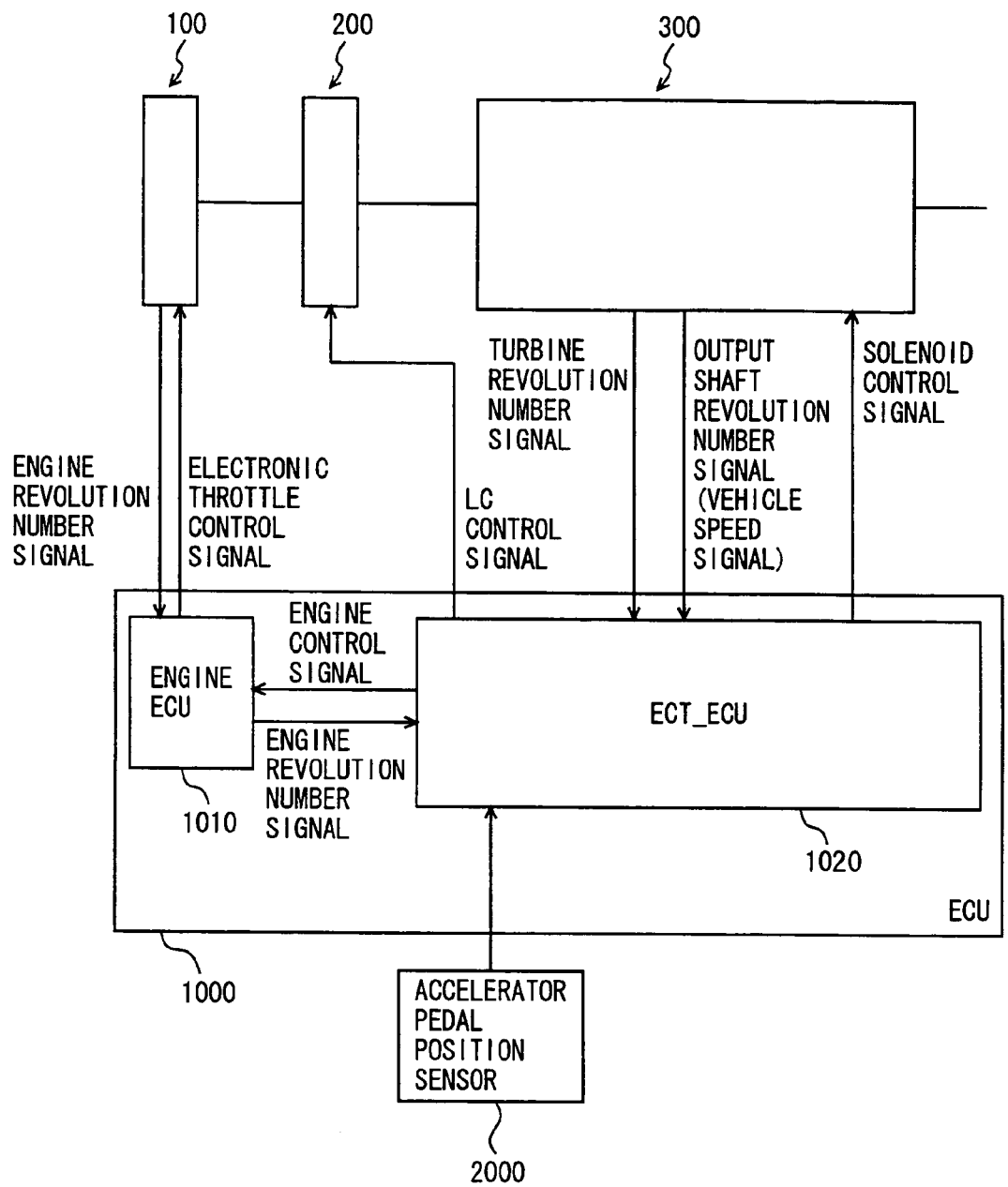
FIG. 1 is a control block diagram of a vehicle incorporating a control apparatus for a vehicle according to a first embodiment.

In the following, referring to the drawings, embodiments of the present invention will be described. In the following description, identical components are denoted by identical reference characters. Their name and function are also the same. Accordingly, detailed description thereof will not be repeated.

First Embodiment

A powertrain of a vehicle incorporating a control apparatus for a vehicle according to an embodiment of the present invention is described. The control apparatus for a vehicle according to the present embodiment is implemented by a program executed by an ECU (Electronic Control Unit) 1000 shown in FIG. 1. In the present embodiment, an automatic transmission is described as an automatic transmission having a gear transmission mechanism with a torque converter as a hydraulic coupling. It is noted that the present invention is not limited to the automatic transmission having the gear transmission mechanism, and it may be a continuously variable transmission of belt type or traction type, for example.

As shown in FIG. 1, the powertrain of the vehicle is constituted of an engine 100, a torque converter 200, a gear transmission mechanism 300, and an ECU 1000.

An output shaft of engine 100 is connected to an input shaft of torque converter 200. Engine 100 and torque converter 200 are coupled via a rotary shaft. Accordingly, the number of revolutions NE of the output shaft of engine 100 (engine revolution number NE) sensed by an engine revolution number sensor and the number of revolutions of the input shaft of torque converter 200 (pump revolution number) are the same.

Torque converter 200 is constituted of a lock-up clutch that renders the input shaft and the output shaft in a directly connected state, a pump impeller on the input shaft side, a turbine impeller on the output shaft side, and a stator having a one-way clutch to implement torque amplification function. Torque converter 200 and gear transmission mechanism 300 are connected by the rotary shaft. Output shaft revolution number NT of torque converter 200 (turbine revolution number NT) is sensed by a turbine revolution number sensor. An output shaft revolution number NOUT of gear transmission mechanism 300 is sensed by an output shaft revolution number sensor.

Such an automatic transmission includes clutches, brakes and the like inside gear transmission mechanism 300, which are a plurality of friction elements. Based on a predetermined operation table, a hydraulic circuit is controlled so that clutch elements (for example, clutches C1-C4) or brake elements (for example, brakes B1-B4) are engaged and disengaged to correspond to each required gear. Shift positions (shift ranges) of the automatic transmission include parking (P) range, reverse (R) range, neutral (N) range, drive (D) range and the like.

ECU 1000 controlling the powertrain includes an engine ECU 1010 controlling engine 100, and an ECT_ECU 1020 controlling the automatic transmission.

To ECT_ECU 1020, a signal indicative of turbine revolution number NT sensed by the turbine revolution number sensor is input. To ECT_ECU 1020, a signal indicative of output shaft revolution number NOUT sensed by the output shaft revolution number sensor is also input. Based on output shaft revolution number NOUT and the final gear ratio, the vehicle speed can be calculated. To ECT_ECU 1020, an engine revolution number signal indicative of engine revolution number NE sensed by the engine revolution number sensor is also input from engine ECU 1010.

These revolution number sensors are provided facing gear teeth of gears for detecting revolutions attached to the input shaft of torque converter 200, the output shaft of torque converter 200 and the output shaft of gear transmission mechanism 300. These revolution number sensors are capable of detecting minor revolution of the input shaft of torque converter 200, the output shaft of torque converter 200 and the output shaft of gear transmission mechanism 300, and for example, these are sensors employing magnetoresistant elements generally referred to as semiconductor sensors.

ECT_ECU 1020 outputs an engine control signal (for example, an electronic throttle control signal) to engine ECU 1010 and engine ECUI 1010 controls engine 100 based on the engine control signal.

ECT_ECU 1020 outputs a lock-up clutch control signal (LC control signal) to torque converter 200. Based on this lock-up clutch control signal, a lock-up clutch controlling solenoid is duty-controlled, whereby the engagement pressure of the lock-up clutch is controlled. That is, the control solenoid adjusts the engagement pressure of the lock-up clutch in accordance with the output value (duty ratio) of the lock-up clutch control signal. ECT_ECU 1020 outputs a solenoid control signal to gear transmission mechanism 300. Based on the solenoid control signal, a linear solenoid valve, an on-off solenoid valve and the like of the hydraulic circuit of gear transmission mechanism 300 are controlled, whereby friction engagement elements are controlled to be engaged and disengaged to constitute a prescribed gear (for example, 1-speed to 5-speed).

To ECT_ECU 1020, a signal indicative of the degree of opening of the accelerator pedal pressed down by the driver is also input from accelerator pedal position sensor 2000. Based on the accelerator opening degree signal, the opening degree of the throttle valve is determined. It is noted that the accelerator opening degree signal may be input to engine ECU1010. ECU1000 also has a memory storing various data and programs.

The lock-up clutch is engagement-controlled, disengagement-controlled, or slip-controlled, in accordance with the traveling state of the vehicle. Specifically, when the vehicle traveling state is in an engagement range engaging the lock-up clutch, the lock-up clutch is engagement-controlled; when the vehicle traveling state is in a disengagement range disengaging the lock-up clutch, the lock-up clutch is disengagement-controlled; and when the vehicle traveling state is in a slip-control range slip-controlling the lock-up clutch, the lock-up clutch is slip-controlled.

Specifically, to ECU 1000 that implements a control apparatus according to the present embodiment, as shown in FIG. 2, a lock-up clutch engagement range, a lock-up clutch disengagement range and a slip control range are set based on the relationship between the opening degree of the throttle valve and the vehicle speed (or the output shaft revolution number of gear transmission mechanism 300). Then, when the vehicle traveling state is in the lock-up clutch engagement range, ECU 1000 controls the engagement pressure of the lock-up clutch, that is, the engagement force of the lock-up clutch so that the lock-up clutch engages, and when the vehicle traveling state is in the lock-up clutch disengagement range, ECU 1000 controls the engagement force of the lock-up clutch so that the lock-up clutch disengages. When the vehicle traveling state is in the slip control range, ECU 1000 controls the engagement force of the lock-up clutch so that the slip amount of the lock-up clutch meets a predetermined slip amount (for example, 50 rpm). Here, the slip amount refers to the difference between the number of revolutions of engine 100 and turbine revolution number NT, that is, the difference between the input side revolution number of torque converter 200 and the output side revolution number thereof.

The present embodiment is characterized in that, in the engagement range, ECU 1000 controls the engagement force of the lock-up clutch so that the slip amount of the lock-up clutch meets a target slip amount slip (1), and updates a learning value modifying a control value for obtaining a predetermined slip amount based on a control value of the engagement force corresponding to target slip amount slip (1), that is, a control value of the lock-up clutch controlling solenoid (an output value of the lock-up clutch control signal).

Figure 3:
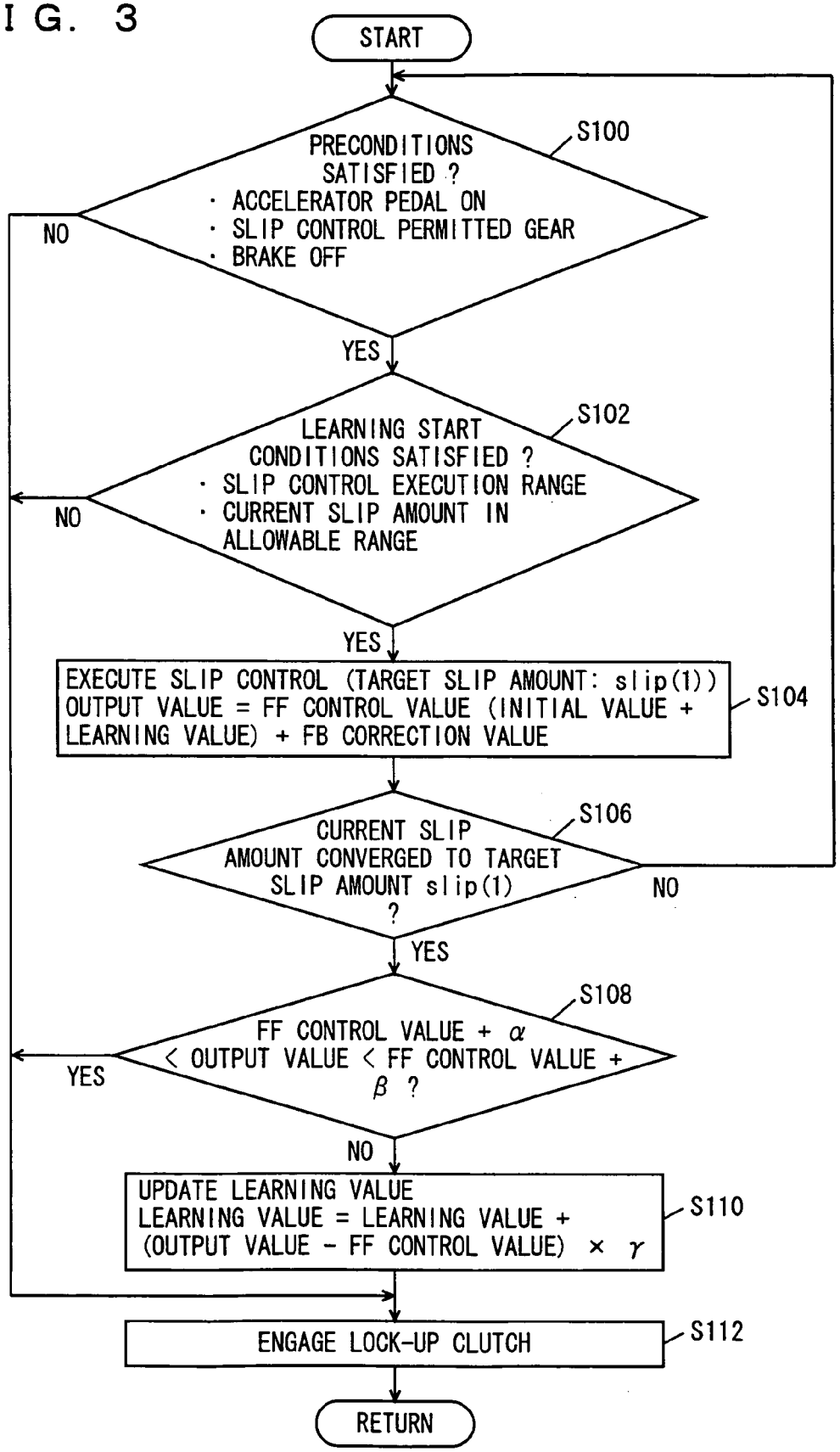
FIG. 3 is a flowchart showing a control structure of a program executed by an ECU implementing the control apparatus for a vehicle according to the first embodiment.

Referring to FIG. 3, a control structure of a program executed by ECU 1000 implementing the control apparatus for a vehicle according to the present embodiment is described. It is noted that the program is executed when the traveling state of the vehicle is in the lock-up clutch engagement range.

In step (hereinafter step is abbreviated as "S") 100, ECU 1000 determines whether or not preconditions are satisfied. The preconditions are: the accelerator pedal is on; the slip control is permitted with the gear; and the brake is off. It is noted that the preconditions are not particularly limited to such three conditions.

ECU 1000 determines that the accelerator pedal is on, for example if the accelerator pedal position received from accelerator pedal position sensor 2000 does not indicate full closure. Alternatively, ECU 1000 may determine that the accelerator pedal is on based on an engine revolution number signal, i.e., if the engine revolution number signal does not indicate the number of revolutions of the engine in an idle mode.

ECU 1000 senses the gear currently selected by ECT_ECU 1020 to determine whether or not the slip control is permitted with the sensed gear. The gear with which the slip control is permitted may be, for example, 2- and more speed, or 3- and more speed, and it is not particularly limited.

Further, ECU 1000 determines whether or not the brake is off, based on the a brake signal received from a brake lamp switch (not shown). For example, ECU 1000 determines that the brake is off, when it does not receive an on-signal from the brake lamp switch.

In S102, ECU 1000 determines whether or not learning start conditions are satisfied. The learning start conditions are: the traveling state of the vehicle is in an execution range of the slip control; and the current slip amount of the lock-up clutch is in a predetermined allowable range.

ECU 1000 senses the opening degree of the throttle valve, based on an electronic throttle control signal or a signal corresponding to the opening degree of the throttle valve received from a throttle position sensor (not shown). ECU 1000 senses the vehicle speed based on an output shaft revolution number signal received from the output shaft revolution number sensor or a vehicle speed signal received from a wheel speed sensor (not shown). ECU 1000 determines whether or not the traveling state of the vehicle based on the sensed opening degree of the throttle valve and vehicle speed is in an execution range of the slip control being set.

ECU 1000 senses the slip amount of the lock-up clutch to determine whether or not the sensed slip amount is in a predetermined allowable range. The predetermined allowable range is not particularly limited, and an appropriate range may be determined upon experiments.

In S104, ECU 1000 executes the slip control. Here, ECU 1000 transmits an LC control signal to the lock-up clutch controlling solenoid so that the slip amount of the lock-up clutch meets target slip amount slip (1). It is noted that target slip amount slip (1) is set to be at most a predetermined slip amount as a target value for the slip control when the vehicle traveling state is in the slip control range.

ECU 1000 sets an output value of the lock-up clutch controlling solenoid to be a feedforward control value (hereinafter referred to as FF control value)+ a feedback correction value (hereinafter referred to as FB correction value).

"FF control value" is obtained by adding a learning value to an initial value. The initial value is set in accordance with the opening degree of the throttle valve and the turbine revolution number of torque converter 200, and it can be determined in advance by experiments or the like so that the engagement pressure of the lock-up clutch to be target slip amount slip (1) is obtained. The initial value is calculated, for example by referring to a map or the like that is stored in advance in the memory of ECU 1000.

The learning value is a value modifying, when the traveling state of the vehicle is in the slip control range, the initial value so that the slip amount of the lock-up clutch meets the predetermined slip amount irrespective of the individual difference of engine 100, the change in the engine output over time and the like. While the learning value is learned by subtracting the initial value from the output value to the controlling solenoid, for example when the engine revolution number, the opening degree of the throttle valve, the turbine revolution number NT, the vehicle speed, the slip amount, the output value of the controlling solenoid and the like become substantially stable for a predetermined time or cycle when the traveling state of the vehicle is in the slip control range, in the present embodiment, the learning is performed also in the lock-up clutch engagement range. The learning value is stored in the memory of ECU 1000, and read from the memory.

FB correction value is a value calculated in accordance with the difference between the current slip amount and target slip amount slip (1), for example using a control expression of feedback such as PID operation. The feedback control is a well-known technique, and therefore detailed description thereof is not provided.

In S106, ECU 1000 determines whether or not the current slip amount of the lock-up clutch has converged to target slip amount slip (1). For example, it determines whether or not the sensed slip amount of the lock-up clutch is within a prescribed range around target slip amount slip (1) for a predetermined time or cycle. It is noted that the prescribed range is not particularly limited, and an appropriate range is determined upon experiments. If it is determined that the current slip amount has converged to target slip amount slip (1) (YES in S106), the process goes to 508. Otherwise (NO in S106), the process goes back to S100.

In S108, ECU 1000 determines whether or not the output value is greater than the FF control value+α and smaller than the FF control value+β. β is at least greater than α. α and β may be positive or negative. ECU 1000 determines whether or not the output value that is provided when the slip amount is controlled to be target slip amount slip (1) is outside the range determined in advance with reference to the initial value+ the learning value. α and β are not specifically limited and may be determined as appropriate upon experiments, for example. If the output value is greater than the FF control value+α and smaller than the FF control value+β (YES in S108), the process goes to S112. Otherwise (NO in S108), the process goes to S110.

In S110, ECU 1000 updates the learning value. Specifically, ECU 1000 replaces the learning value with a value calculated by the following expression: learning value+ (output value− FF control value)×γ. It is noted that γ is not specifically limited and may be determined as appropriate upon experiments, for example.

Here, ECU 1000 rewrites the data of learning value in accordance with the slip amount. For example, if the FF control value corresponding to target slip amount slip (1) before learning is A(0) and that corresponding to target slip amount slip (1) after learning is A(1), then as shown in FIG. 4 the relationship between the slip amount and the FF control value is indicated by the dashed line, being translated toward the right side of the drawings from the solid line of before learning by the correction of the learning value A(1)−A(0).

In S112, ECU 1000 controls the controlling solenoid so that the lock-up clutch attains the engagement state.

An operation of ECU 1000 implementing the control apparatus for the vehicle according to the present embodiment based on the above-described structure and flowchart will be described referring to FIGS. 5A-5C.

Figure 5A:
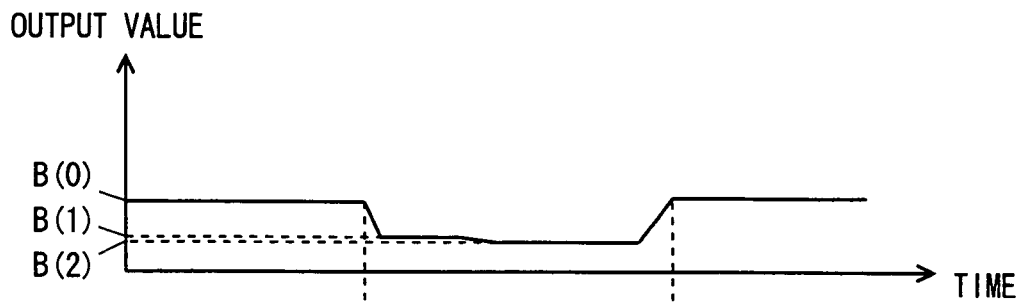
FIGS. 5A-5C are timing charts showing operation of the ECU implementing the control apparatus for a vehicle according to the first embodiment.
Figure 5B:
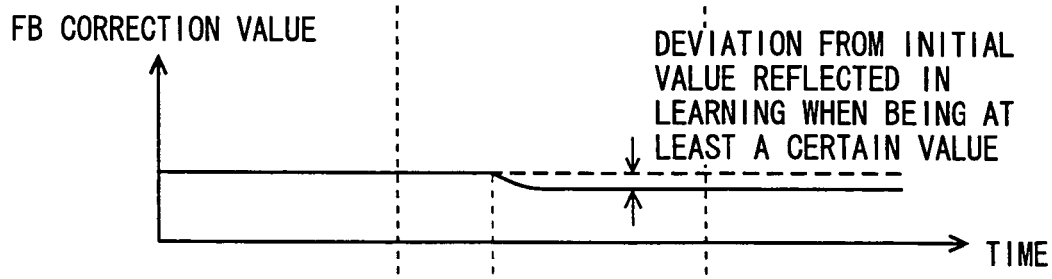
Figure 5C:
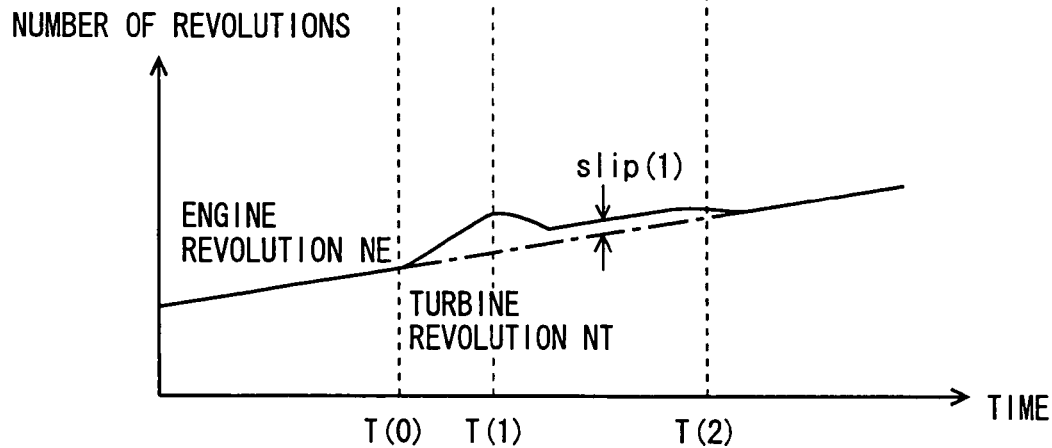

As shown in FIG. 5A, at time T(0), when the preconditions are satisfied (YES in S100) and the learning start conditions are satisfied (YES in S102), the output value to the lock-up clutch controlling solenoid is changed from B(0) to B(1) and the slip control is executed (S104). Here, the slip starts and the difference arises between engine revolution number NE and turbine revolution number NT. As shown in FIG. 5C, when the slip starts, engine revolution number NE (solid line) becomes higher than turbine revolution number NT (alternate long and short dashed line). As shown in FIG. 5B, at time T(1), when the FB correction value based on the feedback control expression is added to the output value, the output value is changed from B(1) to B(2). Then, as shown in FIG. 5C, when the slip amount converges to target slip amount slip (1) (YES in S106), learning is performed based on output value B(2) provided to the controlling solenoid. When output value B(2) provided to the controlling solenoid is not greater than the FF control value+α or not smaller than the FF control value+β (NO in S108), the learning value is updated (S110), and the map of learning value is rewritten. When the learning has completed, at time T(2), the lock-up clutch is controlled to engage (S112).

As described above, according to the control apparatus for a vehicle in the present embodiment, when the state of the opening degree of the throttle valve of the vehicle and the vehicle speed is in the lock-up clutch engagement range, the lock-up clutch is controlled so that the slip amount of the lock-up clutch meets a target slip amount slip (1). Based on the control value corresponding to the engagement pressure of the lock-up clutch being controlled to attain target slip amount slip (1), the learning value is updated. When the control value corresponding to the engagement pressure of the lock-up clutch being controlled to attain target slip amount slip (1) is outside the allowable range determined in advance with reference to the FF control value, the learning value is updated to correspond to the slip amount. Thus, since learning of the control value that has conventionally been performed in the slip control range can also be performed in the lock-up clutch engagement range, the frequency of learning is increased. As a result, the accuracy of the slip control can be improved. Accordingly, the control apparatus for a vehicle that improves the accuracy of slip control by increasing learning frequency can be provided.

Second Embodiment

In the following, a control apparatus for a vehicle according to a second embodiment of the present invention is described. Compared with the structure of the vehicle incorporating the control apparatus for a vehicle according to the first embodiment described above, the vehicle incorporating the control apparatus for a vehicle according to the second embodiment is different in the control structure of a program executed by ECU 1000. The rest of the structure is the same as the vehicle incorporating the control apparatus for a vehicle according to the first embodiment described above. Such components are denoted by identical reference characters. Their name and function are also the same. Accordingly, detailed description thereof will not be repeated.

In the following, referring to FIG. 6, the control structure of the program executed by ECU 1000 implementing the control apparatus for a vehicle according to the present embodiment is described.

Figure 6:
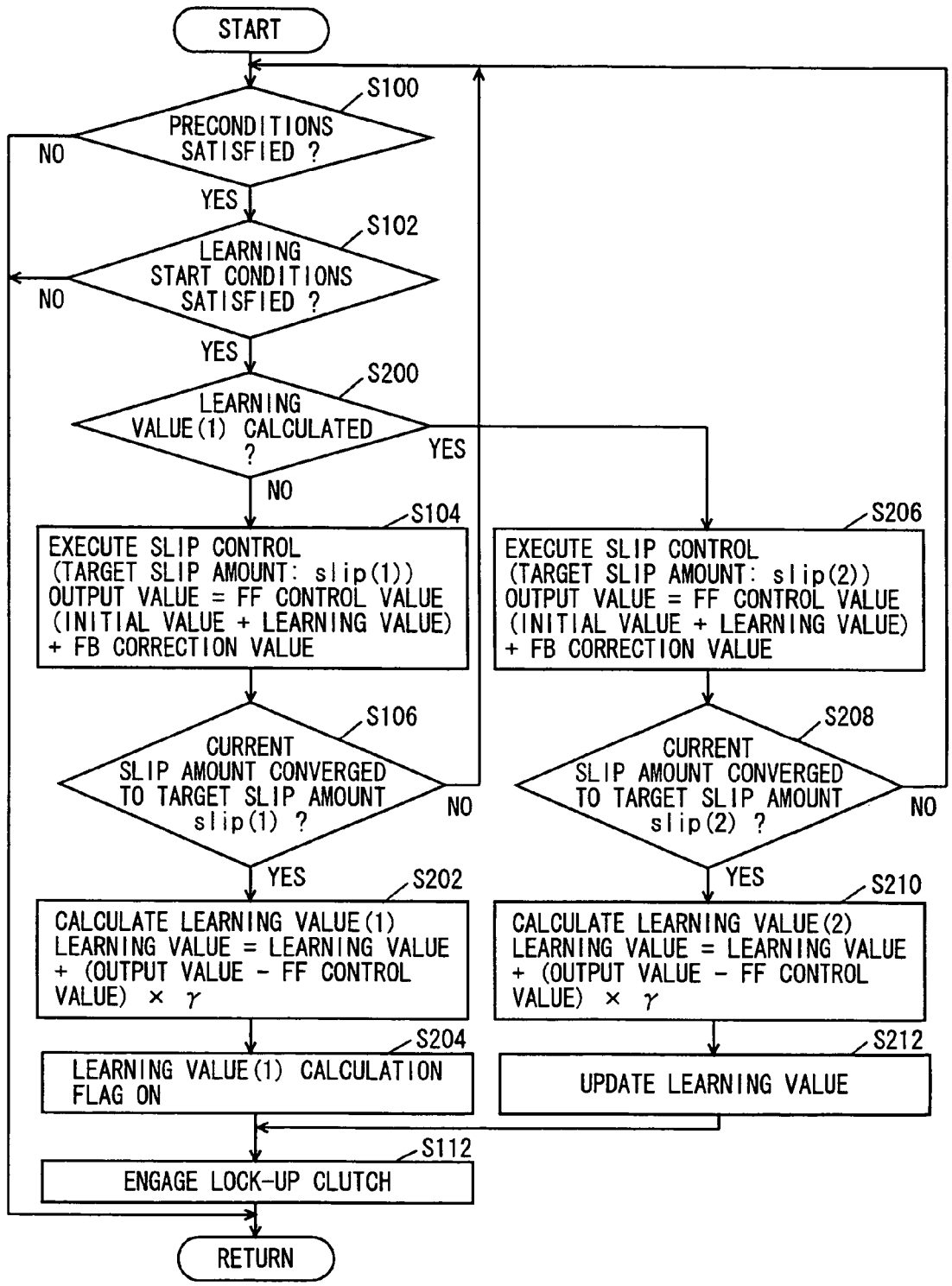
FIG. 6 is a flowchart showing a control structure of a program executed by an ECU implementing the control apparatus for a vehicle according to a second embodiment.

In the flowchart of FIG. 6, process steps being identical to those in the flowchart of FIG. 3 are denoted by identical step reference characters. They are identically processed. Accordingly, detailed description thereof will not be repeated.

In S200, ECU 1000 determines whether or not learning value (1) has been calculated, based on whether or not a learning value (1) calculation flag is on. Learning value (1) calculation flag is turned off when the traveling state of the vehicle deviates from the lock-up clutch engagement range, for example. When learning value (1) has not been calculated (NO in S200), in S104, the lock-up clutch is slip-controlled so that the slip amount of the lock-up clutch meets a target slip amount slip (1). When the slip amount of the lock-up clutch converges to target slip amount slip (1) (YES in S106), the process goes to S202.

In S202, ECU 1000 calculates learning value (1). ECU 1000 calculates learning value (1) from the following expression: learning value+(output value−FF control value)×γ. It is noted that γ is not specifically limited and may be determined as appropriate upon experiments, for example. Additionally, when the output value is greater than the FF control value+α and smaller than the FF control value+β as in the above-described first embodiment, learning value (1) may be employed as the current learning value.

In S204, ECU 1000 turns the learning value (1) calculation flag on. When learning value (1) calculation flag is turned on, in the next process, positive determination will be made in S200. Specifically, when it is determined that the preconditions are satisfied (YES in S100), and that the vehicle traveling state is in the slip control execution range similarly as when learning value (1) was calculated and thus the learning start conditions are satisfied (YES in S102), in S200, it is determined that learning value (1) has been calculated, and the process goes to S206.

In S206, ECU 1000 executes the slip control. Here, ECU 1000 controls the engagement pressure of the lock-up clutch so that the target slip amount is set to target slip amount slip (2). Here, target slip amount slip (2) is different from target slip amount slip (1), and set to be at most a predetermined slip amount as the target value for the slip control when the traveling state of the vehicle is in the slip control range. In the present embodiment, slip (2) is for example smaller than slip (1).

In S208, ECU 1000 determines whether or not the current slip amount of the lock-up clutch has converged to target slip amount slip (2). For example, it determines whether or not the sensed slip amount of the lock-up clutch is within a prescribed range around target slip amount slip (2) for a predetermined time or cycle. It is noted that the prescribed range is not particularly limited, and an appropriate range is determined upon experiments. If it is determined that the current slip amount of the lock-up clutch has converged to target slip amount slip (2) (YES in S208), the process goes to S210. Otherwise (NO in S208), the process goes back to S100.

In S210, ECU 1000 calculates learning value (2). ECU 1000 calculates learning value (2) from the following expression: learning value+(output value−FF control value)×γ. It is noted that γ is not specifically limited and may be determined as appropriate upon experiments, for example. Additionally, when the output value is greater than the FF control value+α and smaller than the FF control value+β as in the above-described first embodiment, learning value (2) may be employed as the current learning value.

Figure 7:
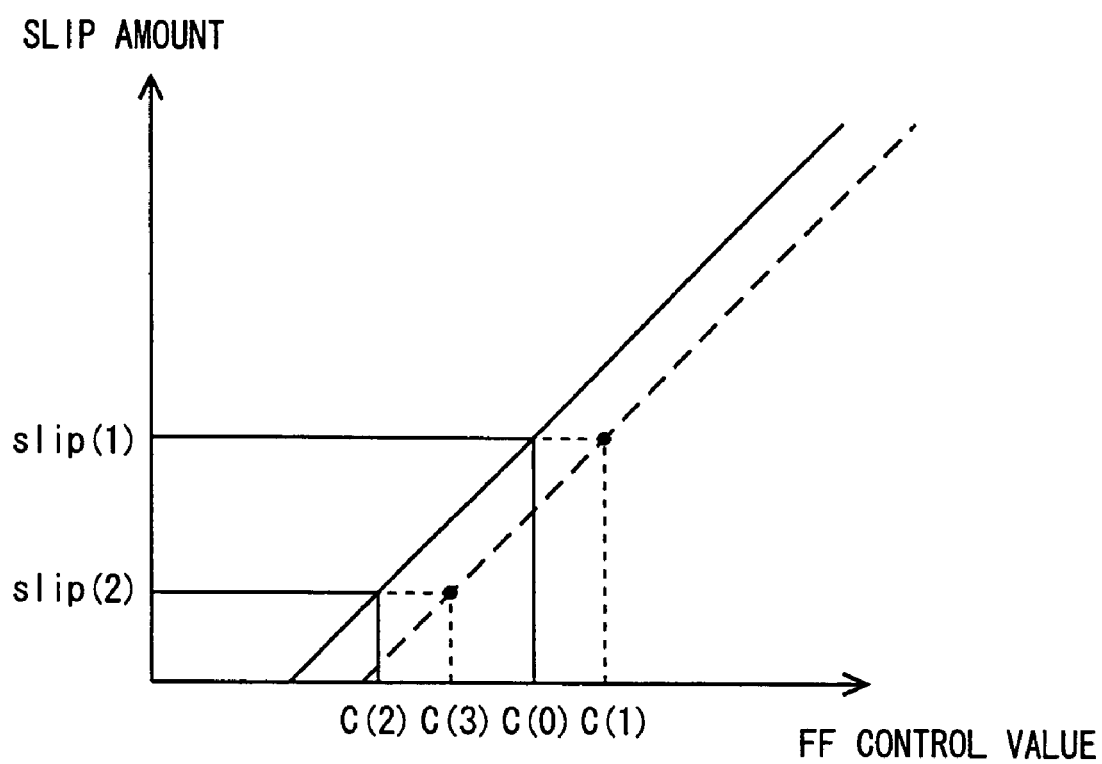
FIG. 7 shows the relationship between slip amount and FF control value in the second embodiment.

In S212, ECU 1000 updates the learning value. Here, ECU 1000 rewrites the data of learning value in accordance with the slip amounts where learning values (1) and (2) are calculated. For example, it is assumed that: the FF control value corresponding to target slip amount slip (1) before learning is C(0); the FF control value corresponding to target slip amount slip (1) after learning is C(1); the FF control value corresponding to target slip amount slip (2) before learning is C(2); and the FF control value corresponding to target slip amount slip (2) after learning is C(3). As shown in FIG. 7, the relationship between the slip amount and the FF control value is indicated by the dashed line formed by two-point interpolation as based on target slip amounts slip (1) and slip (2) corresponding to FF control values after learning C(3) and C(1), respectively, from the solid line passing through FF control values C(0) and C(2) corresponding to target slip amounts slip (1) and slip (2) before learning, respectively.

An operation of ECU 1000 implementing the control apparatus for the vehicle according to the present embodiment based on the above-described structure and flowchart will be described referring to FIGS. 8A-8C.

Figure 8A:
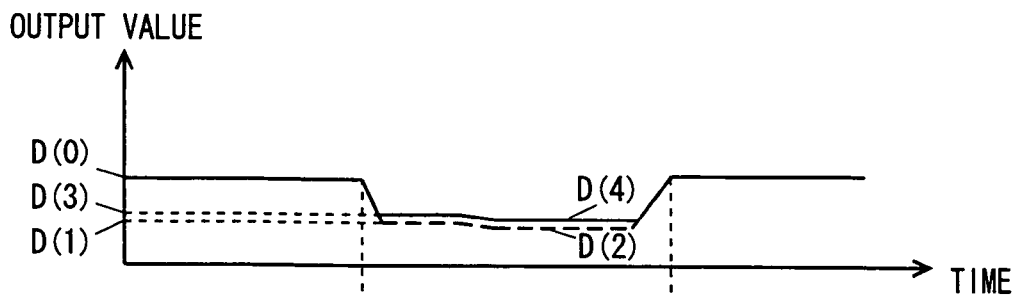
FIGS. 8A-8C are timing charts showing operation of the ECU implementing the control apparatus for a vehicle according to the second embodiment.
Figure 8B:
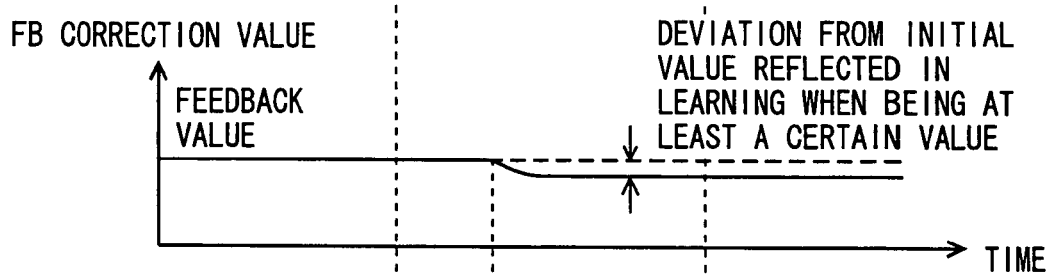
Figure 8C:
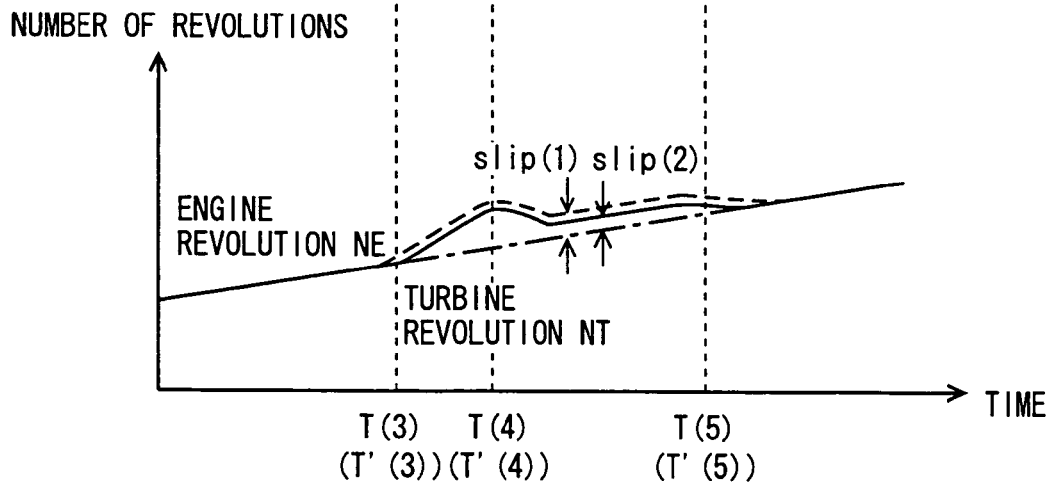

First, as indicated by the dashed line in FIG. 8A, at time T(3), when the preconditions are satisfied (YES in S100) and the learning start conditions are satisfied (YES in S102), the output value to the lock-up clutch controlling solenoid is changed from D(0) to D(1) and the slip control is executed (S104). Here, the slip starts and the difference arises between engine revolution number NE and turbine revolution number NT. As indicated by the dashed line in FIG. 8C, when the slip starts, engine revolution number NE (dashed line) becomes higher than turbine revolution number NT (alternate long and short dashed line). As shown in FIG. 8B, at time T(4), when the FB correction value based on the feedback control expression is added to the output value, the output value is changed from D(1) to D(2). Then, as shown in FIG. 8C, when the slip amount converges to target slip amount slip (1) (YES in S106), learning value (1) is calculated based on output value D(2) provided to the lock-up clutch controlling solenoid (S202). At time T(5), the lock-up clutch is controlled to engage (S112).

Subsequently, when the learning start conditions are satisfied (YES in S102), as indicated by the solid line in FIG. 8A, at time T'(3), the output value to the lock-up clutch controlling solenoid is changed from D(0) to D(3) and the slip control is executed (S206). Here, the slip starts and the difference arises between engine revolution number NE and turbine revolution number NT. As indicated by the dashed line in FIG. 8C, when the slip starts, engine revolution number NE (dashed line) becomes higher than turbine revolution number NT (alternate long and short dashed line). Then, as shown in FIG. 8B, at time T'(4), when the FB correction value based on the feedback control expression is added to the output value, the output value is changed from D(3) to D(4). As shown in FIG. 8C, when the slip amount converges to target slip amount slip (2) (YES in S208), learning value (2) is calculated based on output value D(4) provided to the lock-up clutch controlling solenoid (S210). Then, based on the calculated learning values (1) and (2), the learning values are updated (S212), and the map of learning value is rewritten.

As described above, according to the control apparatus for a vehicle in the present embodiment, in addition to the effect attained by the control apparatus for a vehicle in the first embodiment described above, the learning value can be updated with high accuracy by calculating learning values corresponding to the two different target slip amounts on condition that the vehicle traveling state is substantially unchanged in the engagement range of the lock-up clutch, and performing two-points interpolation based on the calculated learning values.

Third Embodiment

In the following, a control apparatus for a vehicle according to a third embodiment of the present invention is described. Compared with the structure of the vehicle incorporating the control apparatus for a vehicle according to the first embodiment described above, the vehicle incorporating the control apparatus for a vehicle according to the third embodiment is different in the control structure of a program executed by ECU 1000. The rest of the structure is the same as the vehicle incorporating the control apparatus for a vehicle according to the first embodiment described above. Such identical components are denoted by identical reference characters. Their name and function are also the same. Accordingly, detailed description thereof will not be repeated.

The present embodiment is characterized in that, when shifting from the disengagement range to the engagement range, ECU 1000 controls the engagement force of the lock-up clutch so that the slip amount of the lock-up clutch meets a target slip amount slip (1), and updates a learning value modifying a control value for obtaining a predetermined slip amount based on a control value of the engagement force corresponding to target slip amount slip (1).

In the following, referring to FIG. 9, a control structure of a program executed by ECU 1000 implementing the control apparatus for a vehicle according to the present embodiment is described.

Figure 9:
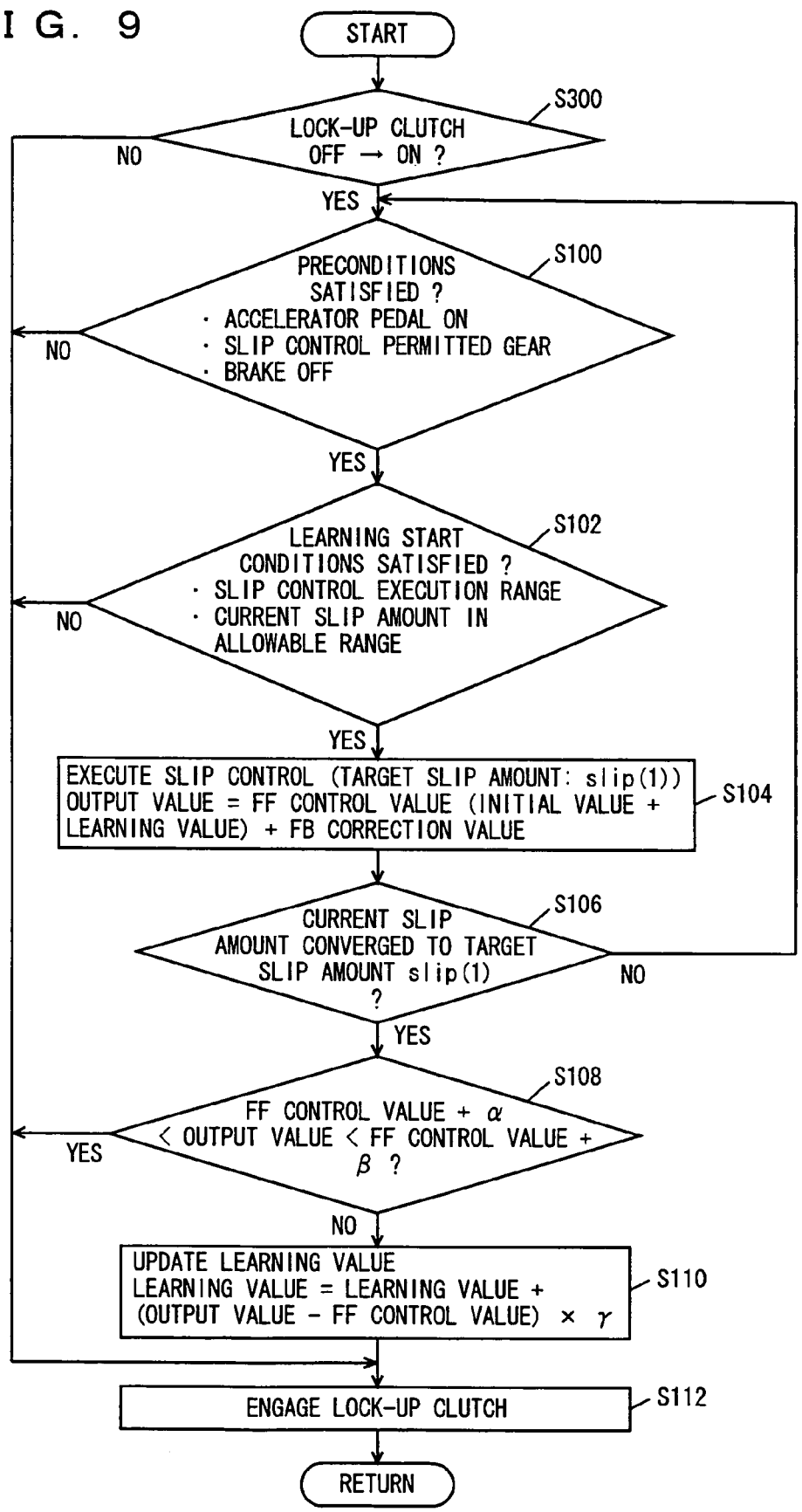
FIG. 9 is a flowchart showing a control structure of a program executed by an ECU implementing the control apparatus for a vehicle according to a third embodiment.

It is noted that, in the flowchart of FIG. 9, process steps being identical to those in the flowchart of FIG. 3 are denoted by identical step reference characters. They are identically processed. Accordingly, detailed description thereof will not be repeated.

In S300, ECU 1000 determines whether or not the lock-up clutch has been turned on from off. Specifically, as described referring to FIG. 3 in the first embodiment, ECU 1000 determines whether or not the lock-up clutch has been turned on from off based on whether or not the vehicle traveling state has shifted from the lock-up clutch disengagement range to the lock-up clutch engagement range. Accordingly, ECU 1000 determines whether or not the lock-up clutch has been turned on from off based on sensed opening degree of the throttle valve and vehicle speed.

An operation of ECU 1000 implementing the control apparatus for the vehicle according to the present embodiment based on the above-described structure and flowchart will be described referring to FIGS. 10A-10D.

Figure 10A:
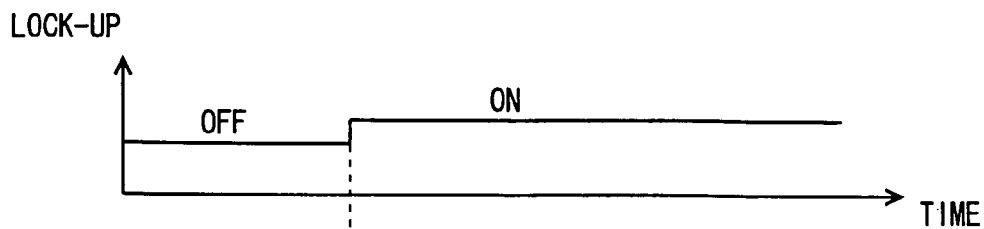
FIGS. 10A-10D are timing charts showing operation of the ECU implementing the control apparatus for a vehicle according to the third embodiment.
Figure 10B:
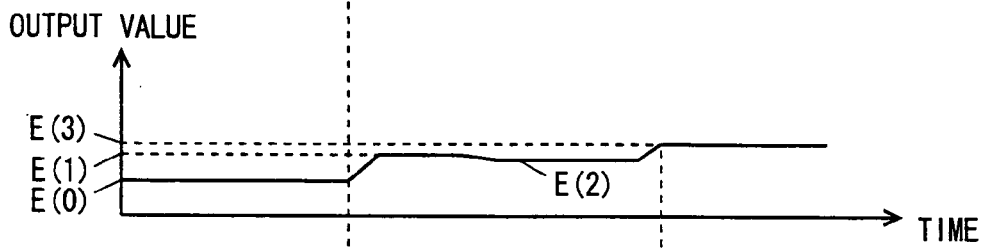
Figure 10C:
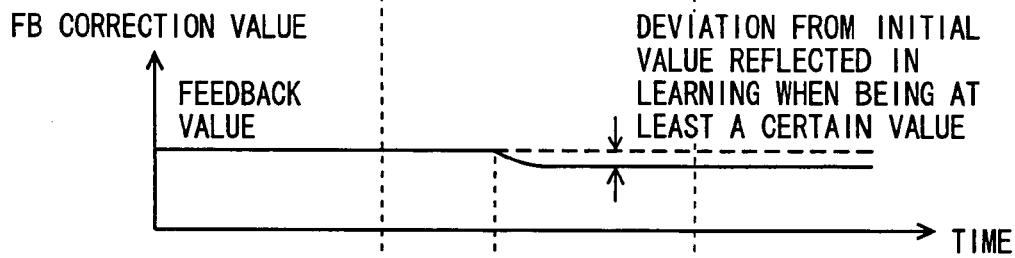
Figure 10D:
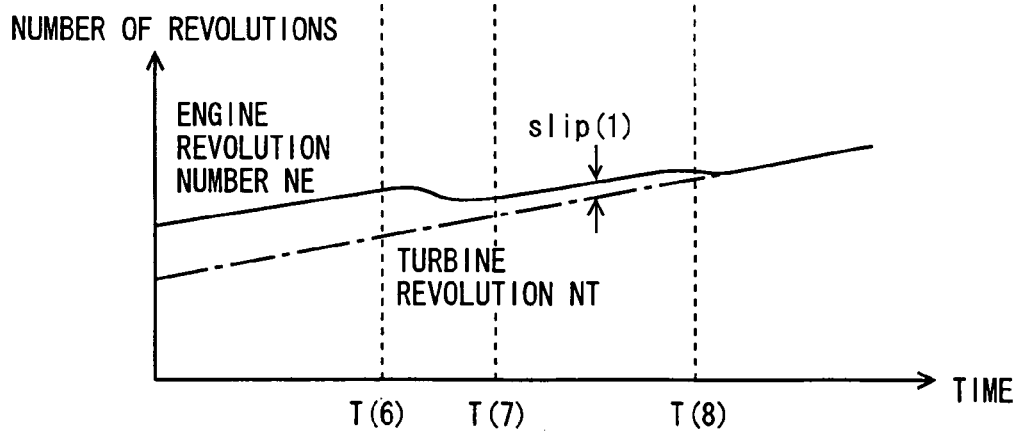

When the vehicle traveling state has shifted from the lock-up clutch disengagement range to the lock-up clutch engagement range, as shown in FIG. 10A, at time T(6), the lock-up clutch is turned on. Here, when the preconditions are satisfied (YES in S100) and the learning start conditions are satisfied (YES in S102), as shown in FIG. 10B, the output value to the lock-up clutch controlling solenoid is changed from E(0) to E(1) and the slip control is executed (S104). Here, as shown in FIG. 10D, the difference between engine revolution number NE (solid line) and turbine revolution number NT (alternate long and short dashed line) gradually becomes smaller. Then, as shown in FIG. 10C, at time T(7), when the FB correction value based on the feedback control expression is added to the output value, the output value is changed from E(1) to E(2). Then, as shown in FIG. 10D, when the slip amount converges to target slip amount slip (1) (YES in S106), learning is performed based on output value E(2) provided to the controlling solenoid. When output value E(2) provided to the controlling solenoid is not greater than the FF control value+α or not smaller than the FF control value+β (NO in S108), the learning value is updated (S110), and the map of learning value is rewritten. When the learning has completed, at time T(8), the output value becomes E(3), and the lock-up clutch is controlled to engage (S112).

As described above, according to the control apparatus for a vehicle in the present embodiment, when the state of the opening degree of the throttle valve of the vehicle and the vehicle speed has shifted from the engagement range of the lock-up clutch to the disengagement range, the lock-up clutch is controlled so that the slip amount meets a target slip amount slip (1). When the control value corresponding to the engagement pressure of the lock-up clutch being controlled to attain target slip amount slip (1) is outside the allowable range determined in advance with reference to the FF control value, the learning value is updated to correspond to the slip amount. Thus, since learning of the control value that has conventionally been performed in the slip control range can also be performed when the state has shifted from the lock-up clutch disengagement range to the lock-up clutch engagement range, the frequency of learning is increased. As a result, the accuracy of the slip control can be improved. Accordingly, the control apparatus for a vehicle that improves the accuracy of slip control by increasing learning frequency can be provided.

It is noted that, when the vehicle traveling state is substantially unchanged, a plurality of target slip amounts may be set, so that the learning is performed and the learning value is updated based on the calculated plurality of learning values. Thus, the learning value can be updated precisely.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for a vehicle incorporating an automatic transmission including a hydraulic coupling with a lock-up clutch, comprising:
   a controlling portion that controls an engagement force of said lock-up clutch in accordance with a traveling state of said vehicle, such that said lock-up clutch engages when said traveling state is in an engagement range, such that said lock-up clutch disengages when said traveling state is in a disengagement range, and such that a slip amount of said lock-up clutch meets a predetermined slip amount when said traveling state is in a slip control range; and
   a learning portion that controls the engagement force of said lock-up clutch to a first output value such that the slip amount of said lock-up clutch meets a target slip amount, and that updates a learning value that modifies a control value for obtaining said predetermined slip amount based on the first output value of the engagement force corresponding to said target slip amount,
   wherein the learning portion begins the control of the engagement force of said lock-up clutch to the first output value when said traveling state is in said engagement range and said lock-up clutch is engaged.

2. The control apparatus for a vehicle according to claim 1, wherein
   said target slip amount is a first target slip amount, and
   said learning portion controls the engagement force of said lock-up clutch such that the slip amount of said lock-up clutch meets a second target slip amount that is different from said first target slip amount, and updates said learning value based on a second output value of the engagement force corresponding to said second target slip amount and the first output value of the engagement force corresponding to said first target slip amount.

3. A control apparatus for a vehicle incorporating an automatic transmission including a hydraulic coupling with a lock-up clutch, comprising:
   a controlling portion that controls an engagement force of said lock-up clutch in accordance with a traveling state of said vehicle, such that said lock-up clutch engages when said traveling state is in an engagement range, such that said lock-up clutch disengages when said traveling state is in a disengagement range, and such that a slip amount of said lock-up clutch meets a predetermined slip amount when said traveling state is in a slip control range; and
   a learning portion that controls, when said traveling state has moved from said disengagement range to said engagement range, the engagement force of said lock-up clutch to a first output value such that the slip amount of said lock-up clutch meets a target slip amount, that compares the first output value to a minimum output value, that compares the first output value to a maximum output value, and that updates a learning value that modifies a control value for obtaining said predetermined slip amount based on the first output value of the engagement force corresponding to said target slip amount, when the first output value is between the minimum output value and the maximum output value.

4. The control apparatus for a vehicle according to claim 3, wherein
   said target slip amount is a first target slip amount, and
   said learning portion controls the engagement force of said lock-up clutch such that the slip amount of said lock-up clutch meets a second target slip amount that is different from said first target slip amount, and updates said learning value based on a second output value of the engagement force corresponding to said second target slip amount and the first output value of the engagement force corresponding to said first target slip amount.

5. The control apparatus for a vehicle according to one of claims 2 or 4, wherein said first and second target slip amounts are each at most said predetermined slip amount.

6. The control apparatus for a vehicle according to one of claims 1 or 3, wherein said target slip amount is at most said predetermined slip amount.

7. The control apparatus for a vehicle according to claim 1, wherein the learning portion compares the first output value to a minimum output value, compares the first output value to a maximum output value, and updates the learning value when the first output value is between the minimum output value and the maximum output value.

8. A control apparatus for a vehicle incorporating an automatic transmission including a hydraulic coupling with a lock-up clutch, comprising:
   controlling means for controlling an engagement force of said lock-up clutch in accordance with a traveling state of said vehicle, such that said lock-up clutch engages when said traveling state is in an engagement range, such that said lock-up clutch disengages when said traveling state is in a disengagement range, and such that a slip amount of said lock-up clutch meets a predetermined slip amount when said traveling state is in a slip control range; and
   learning means for controlling the engagement force of said lock-up clutch to a first output value such that the slip amount of said lock-up clutch meets a target slip amount, and updating a learning value that modifies a control value for obtaining said predetermined slip amount based on the first output value of the engagement force corresponding to said target slip amount,
   wherein the controlling the engagement force of said lock-up clutch to the first output value begins when said traveling state is in said engagement range and said lock-up clutch is engaged.

9. The control apparatus for a vehicle according to claim 8, wherein
   said target slip amount is a first target slip amount, and
   said learning means includes means for controlling the engagement force of said lock-up clutch such that the slip amount of said lock-up clutch meets a second target slip amount that is different from said first target slip amount, and updating said learning value based on a second output value corresponding to said second target slip amount and the first output value corresponding to said first target slip amount.

10. A control apparatus for a vehicle incorporating an automatic transmission including a hydraulic coupling with a lock-up clutch, comprising:

controlling means for controlling an engagement force of said lock-up clutch in accordance with a traveling state of said vehicle, such that said lock-up clutch engages when said traveling state is in an engagement range, such that said lock-up clutch disengages when said traveling state is in a disengagement range, and such that a slip amount of said lock-up clutch meets a predetermined slip amount when said traveling state is in a slip control range; and learning means for controlling, when said traveling state has moved from said disengagement range to said engagement range, the engagement force of said lock-up clutch to a first output value such that the slip amount of said lock-up clutch meets a target slip amount, comparing the first output value to a minimum output value, comparing the first output value to a maximum output value, and updating a learning value that modifies a control value for obtaining said predetermined slip amount based on the first output value of the engagement force corresponding to said target slip amount, when the first output value is between the minimum output value and the maximum output value.

11. The control apparatus for a vehicle according to claim 10, wherein said target slip amount is a first target slip amount, and said learning means includes means for controlling the engagement force of said lock-up clutch such that the slip amount of said lock-up clutch meets a second target slip amount that is different from said first target slip amount, and that updates said learning value based on a second output value of the engagement force corresponding to said second target slip amount and the first output value of the engagement force corresponding to said first target slip amount.

12. The control apparatus for a vehicle according to one of claims 9 or 11, wherein said first and second target slip amounts are each at most said predetermined slip amount.

13. The control apparatus for a vehicle according to one of claims 8 or 10, wherein said target slip amount is at most said predetermined slip amount.

14. A control apparatus for a vehicle incorporating an automatic transmission including a hydraulic coupling with a lock-up clutch, wherein said control apparatus is constituted of an ECU, and wherein said ECU controls an engagement force of said lock-up clutch in accordance with a traveling state of said vehicle, such that said lock-up clutch engages when said traveling state is in an engagement range, such that said lock-up clutch disengages when said traveling state is in a disengagement range, and such that a slip amount of said lock-up clutch meets a predetermined slip amount when said traveling state is in a slip control range, and controls the engagement force of said lock-up clutch to a first output value such that the slip amount of said lock-up clutch meets a target slip amount, that compares the first output value to a minimum output value, that compares the first output value to a maximum output value, and that updates a learning value that modifies a control value for obtaining said predetermined slip amount based on the first output value of the engagement force corresponding to said target slip amount, when the first output value is between the minimum output value and the maximum output value, wherein the control of the engagement force to the first output value begins when said traveling state is in said engagement range and said lock-up clutch is engaged.

15. A control apparatus for a vehicle incorporating an automatic transmission including a hydraulic coupling with a lock-up clutch, wherein said control apparatus is constituted of an ECU, and wherein said ECU controls an engagement force of said lock-up clutch in accordance with a traveling state of said vehicle, such that said lock-up clutch engages when said traveling state is in an engagement range, such that said lock-up clutch disengages when said traveling state is in a disengagement range, and such that a slip amount of said lock-up clutch meets a predetermined slip amount when said traveling state is in a slip control range and controls, when said traveling state has moved from said disengagement range to said engagement range, the engagement force of said lock-up clutch to a first output value such that the slip amount of said lock-up clutch meets a target slip amount, that compares the first output value to a minimum output value, that compares the first output value to a maximum output value, and that updates a learning value that modifies a control value for obtaining said predetermined slip amount based on the first output value of the engagement force corresponding to said target slip amount, when the first output value is between the minimum output value and the maximum output value.

* * * * *